May 19, 1959 R. E. MAUDUECH 2,887,662

PHASE SHIFTING AND MODULATING DEVICE

Filed July 10, 1957 3 Sheets-Sheet 1

May 19, 1959 R. E. MAUDUECH 2,887,662

PHASE SHIFTING AND MODULATING DEVICE

Filed July 10, 1957 3 Sheets-Sheet 2

May 19, 1959 R. E. MAUDUECH 2,887,662

PHASE SHIFTING AND MODULATING DEVICE

Filed July 10, 1957 3 Sheets-Sheet 3

United States Patent Office 2,887,662

Patented May 19, 1959

2,887,662

PHASE SHIFTING AND MODULATING DEVICE

Robert René Mauduech, Paris, France

Application July 10, 1957, Serial No. 671,049

Claims priority, application France July 20, 1956

4 Claims. (Cl. 332—16)

The present invention relates to a phase shifting and modulating device, allowing phase control of a non-modulated alternating current delivered by a source of carrier current connected thereto, under the influence of a control voltage which may be that of a modulating signal or an adjustable direct-current voltage. This device consists of an electrical network with two pairs of terminals, to one of which the carrier current source is connected while the other pair of terminals is connected to a working circuit. A variable resistance, the value of which is controlled by said control voltage, is connected in said network. The phase-modulated (or phase-shifted) voltage is collected at the terminals of one of the impedances forming the network.

A device for the same object has already been described in a paper by G. S. Sanyal and B. Chatterjee, published in the British review "Wireless Engineer," September 1955, pages 255–256. The device described in this paper makes use of a fixed resistance and a fixed reactance, combined with an electronic tube forming the variable resistance controlled by the modulating signal. The phase-modulated voltage is collected at the terminals of said variable resistance.

Another device for the same object is also described in the French Patent 916,976 filed on July 4, 1945, in the name of Compagnie Française Thomson-Houston. It comprises two reactances and a variable resistance, and is of the type having one single pair of terminals, where the phase-modulated voltage is collected when a non-modulated alternating current is injected into the device by means of a carrier current source of practically infinite internal resistance.

The device, the object of this invention, has the advantages, in comparison with the known ones, of a high sensitivity, i.e. of a large phase variation for a given variation of the variable resistance under the action of the control voltage and, on the other hand, of easier matching to a low-impedance carrier current source as those generally used in practice, for instance when frequencies in the 10 mc./s. range are concerned.

According to the present invention, there is provided a phase-modulating device comprising a network with two pairs of terminals and adapted to a non-modulated alternating carrier current source of a fixed frequency connected to the first of said pairs of terminals, so-called input terminals, and a variable resistance connected in said network and the value of which is controlled by the modulating voltage of a source of modulation signal, said device delivering a phase-modulated alternating voltage to a working circuit connected to the second of said pairs of terminals, so-called output terminals, characterized in that said network is a Wheatstone bridge, the four arms of which are formed by reactances, practically without losses, in that said variable carrier current source and variable resistance are respectively connected to the two diagonals of said bridge and in that said second pair of terminals is formed by the terminals of one of the arms of said bridge, the values of said reactances being calculated in such a way that at said fixed frequency said phase-modulated voltage is practically free of amplitude modulation when said resistance varies under the control of said modulating voltage.

According to a first embodiment of the invention, said variable resistance is a non-linear resistance varying under the influence of the voltage of the modulating signal. This non-linear resistance is preferably constituted by a semi-conducting diode.

According to a second mode of embodiment the invention, said variable resistance is the anode-cathode resistance of an amplifying electronic tube, the anode and cathode of which are respectively connected to the two apices of one diagonal of said bridge, while the control grid of said tube is connected to a third apex of said bridge through the modulating voltage source.

The invention will be better understood from the detailed description hereunder and by referring to the annexed drawings, in which.

In the following description, the angular frequency of the carrier current source will be designated by $\omega$, the value of the variable resistance by R, the quantity $1/R$ by $g$ and the "rest" value of the latter by $g_0$, i.e. its value when no modulating voltage is applied.

As usually the imaginary unity will be noted by $j$ ($j=\sqrt{-1}$), the voltage of the carrier current source depending on time $t$ by a factor of the form $e^{j\omega t}$.

Figure 1:
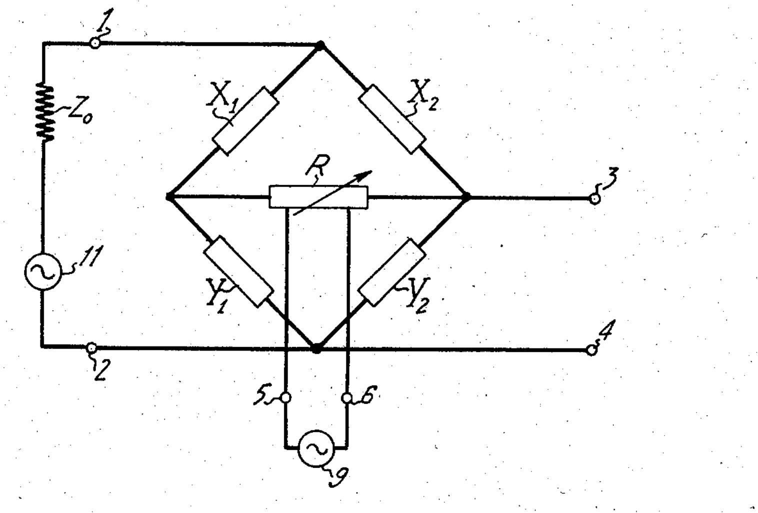
Figure 1 is a simplified diagram representing the device of the invention.

Referring now to Figure 1, the voltage delivered by the source of carrier current 11 with an internal impedance $Z_0$, is applied to the input terminals (1, 2) of the device which are those of a diagonal of a Wheatstone bridge, the four arms of which have the reactances $X_1$, $X_2$, $Y_1$, $Y_2$ at the angular frequency $\omega$. The resistance R is variable according to the voltage of the modulating signal source 9 applied to the control terminals (5, 6) and is connected to the second diagonal of the bridge. The phase modulated voltage is received at the terminals (3, 4) of the reactance $Y_2$, to which the working circuit may be connected. The latter circuit is supposed to have essentially a high resistance but it may have noticeable capacitive or inductive admittance without disadvantage. As a matter of fact, this admittance being in parallel connection with one of the reactances of the bridge, it is possible to take it in account by modifying the value of this reactance. In practice, this admittance will generally be a capacitive one, if for instance, it is the input admittance of an amplifier.

Designating by:

$E$=the electromotive force of source 11
$Z_0$=its internal resistance
$U_1$=the voltage at terminals (1, 2)
$U_2$=the voltage at terminals (3, 4)

the value of $U_2$ is given by:

$$U_2=EM/N \qquad (1)$$

where M and N are linear functions of $X_1$, $X_2$, $Y_1$, $Y_2$ and $g$. Calculation gives:

$$M=(A+jBg)$$

$$N=C-jHZ_0+jg(D-jFZ_0)$$

with:

$$A=(X_1+Y_1)Y_2$$
$$B=(X_1+X_2)Y_1Y_2$$
$$C=(X_1+Y_1)(X_2+Y_2)$$
$$D=X_1Y_1(X_2+Y_2)+X_2Y_2(X_1+Y_1) \quad (2)$$
$$F=(X_1+X_2)(Y_1+Y_2)$$
$$H=X_1+X_2+Y_1+Y_2$$

The impedance Z of the phase shifting and modulating device, seen from the terminals (1, 2) and assuming terminals (3, 4) in open circuit, is equal to:

$$Z=(C+jDg)/(Fg-jH)$$

If the impedance $Z_0$ of source 11 is negligible and can as a first approximation be considered zero, it is found that:

$$U_2/E=U_2/U_1=(A+jBg)/(C+jDg) \quad (3)$$

Considering this case first, the relationship (3) shows that the modulus of the quantity $U_2/U_1$ is independent of $g$, provided that $$B/A=-D/C \quad (4)$$

The phase angle $\phi$ of $U_2/U_1$ is then given by:

$$\phi=2\tan^{-1}(Bg/A) \quad (5)$$

The application of the condition (4) gives the following relationship, between ($X_1$, $X_2$, $Y_1$, $Y_2$):

$$(X_2+Y_2)(2X_1Y_1+X_2Y_1)+X_2Y_2(X_1+Y_1)=0 \quad (6)$$

If, furthermore, it is desired to obtain the maximum possible variation of the angle $\phi$ for a slight variation of $g$ under the action of the modulating voltage of source 9, calculation shows that:

$$A/B \text{ must be } \pm g_0;\ C/D \text{ must be } \mp g_0 \quad (7)$$

for the value $g_0$ taken by $g$ when the modulating voltage is zero. The corresponding value $\phi_0$ (hereafter called "rest" value) of angle $\phi$ is then equal to ±90°.

Figure 6:
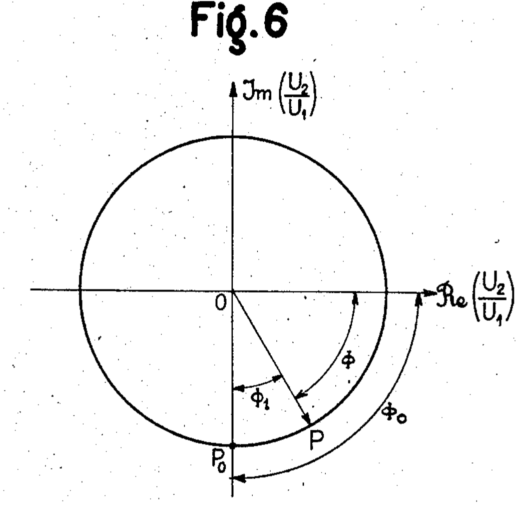
Figure 6 is a diagram provided for the better understanding of the operation of the devices of Figures 1 to 5.

Figure 6 illustrates in this case the operation of the device.

In Figure 6 the vector OP represents the value of the ratio $U_2/U_1$. The abscissae and ordinates respectively represent the values of the real and imaginary parts of this ratio. In the example of Figure 6, $A/B$ is supposed to be equal to $(-g_0)$; the initial value $\phi_0$ of angle $\phi$ is then, in the absence of a modulating voltage, equal to (−90°) and corresponds to point $P_0$ on the circle of center O and radius $OP_0$. The variation of this angle under the influence of the modulating voltage is represented by angle $\phi_1$.

The application of Formulae 7 allows calculation of the reactances ($X_1$, $X_2$, $Y_1$, $Y_2$) when the values of two of them, or two additional relationships between them, are arbitrarily given. It is, for instance possible to arbitrarily choose one of the reactances and to give the quantity $A/C$, which is equal to the modulus of $U_2/U_1$, a predetermined value. It is also possible to select the value of Z as one of the arbitrary conditions. It should also be pointed out that, for every solution of the Equations 6 or 7, there exists a second solution obtained by changing the algebraic sign of all the reactances ($X_1$, $X_2$, $Y_1$, $Y_2$).

The above theory is valid, subject to the condition that R be a non-linear resistance varying under the influence of the modulating voltage from 9. When R is the anode-cathode resistance of an electronic tube, somewhat different formulae, given hereunder in connection with the diagram of Figure 3, should be used.

Figure 2:
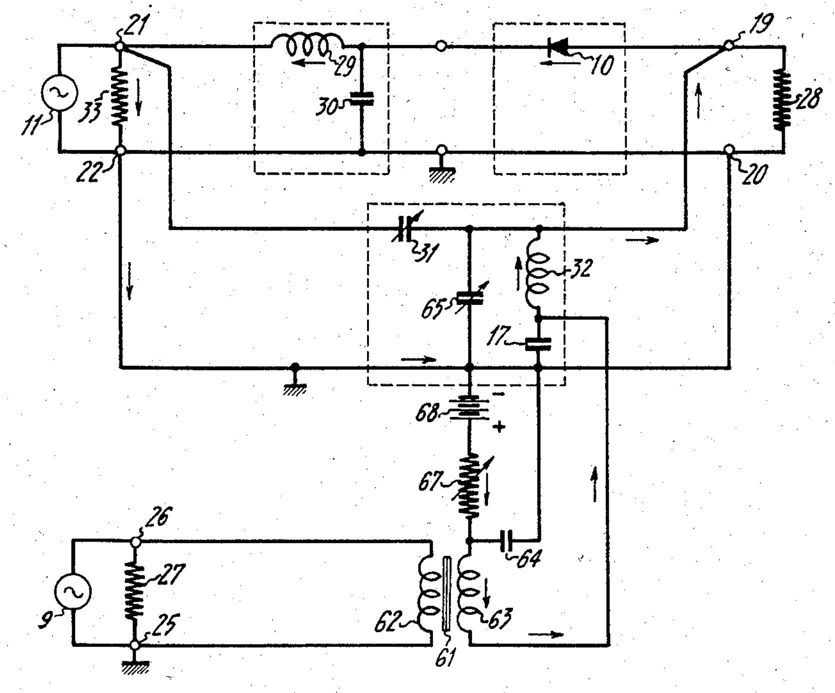
Figure 2 is the diagram of a preferred embodiment of the invention, in which a non-linear resistance is used.

Figure 2 shows a phase-modulating device according to the simplified diagram of Figure 1, using a non-linear resistance 10 consisting of a semi-conducting diode. In the device of Figure 2, the source of high frequency carrier current 11 feeds the input terminals (21, 22) of the bridge consisting of the three reactances (29, 30, 31) which respectively play the parts of $X_1$, $Y_1$, $X_2$ of Figure 1, and of the reactance of the assembly (17, 32, 65), which plays the part of $Y_2$ of Fig. 1. As it is well known, the reactance of this latter assembly is equivalent to that of an inductance of slightly different value from that of inductance 32; the object of the adjustable condenser 65 is to allow adjustment of the apparent equivalent inductance, condenser 17 having a large capacity and being simply destined to prevent propagation of high frequency current from 11 into the circuit of the source 9 of modulation signal. 28 is the resistance of the working circuit connected to output terminals (19, 20), assumed to be of high value, and 33 is a resistance in parallel connection with (21, 22), in order to adjust, if necessary, the input impedance of the device as seen from (21, 22). The source of modulation signal 9, supposed to be an alternating signal, for instance a telephonic signal, is in parallel connection with the resistance 27, the purpose of which is to allow to adjust, if necessary, the impedance of this source to a suitable value. The modulating voltage delivered at terminals (25, 26) is applied to the terminals of the primary winding 62 of a transformer 61, the secondary winding of which is inserted in the circuit of the diode 10. This circuit comprises, in series, the direct-current source 68, the adjustable resistance 67, the winding 63, the inductance 32, the diode 10 and the resistance 33. The adjustable resistance 67 allows adjustment of the value of the biassing direct-current through the diode 10 at a favourable value, i.e. a value for which the incremental resistance of this diode varies rapidly under the action of the modulating voltage appearing at the terminals of 63. The high capacity condenser 17 prevents propagation of the high frequency currents applied to the assembly (31, 32, 65) towards 63 and the source of modulation signal 9. The high capacity condenser 64 also prevents propagation of the currents issued from 9 towards (67, 68).

The phase-modulated voltage is received at terminals (19, 20) connected as well to the working circuit 28 as to the terminals of the assembly (17, 32, 65), the reactance of which is equal to that of element $Y_2$ of Figure 1.

The value $L_1$ of inductance 29, $C_1$ of the capacity of condenser 30, $C_2$ of the capacity of condenser 31 and $L_2$ of the inductance equivalent to the assembly (17, 32, 65) must be chosen in such a way that:

$$X_1=L_1\omega$$
$$X_2=-1/C_2\omega$$
$$Y_1=-1/C_1\omega$$
$$Y_2=L_2\omega$$

conform the appropriate numerical relationships. If the impedance $Z_0$ of source 11 is considered negligible, these are relationship (6) or relationships (7). If $Z_0$ is not negligible, the values $L_1$, $C_1$, $L_2$, $C_2$ must be slightly modified so that the voltage developed at terminals (19, 20), when undergoing strong phase modulation, keeps nevertheless a practically constant amplitude. The proper adjustment can be obtained experimentally, by giving first $L_1$, $C_1$, $L_2$, $C_2$, the nominal values which they should have if $Z_0$ were zero and by slightly varying these four quantities. Practice has shown that it is sufficient to adjust two of them, for instance $L_2$ and $C_2$, by means of the adjustable condensers (31, 65).

Figure 3:
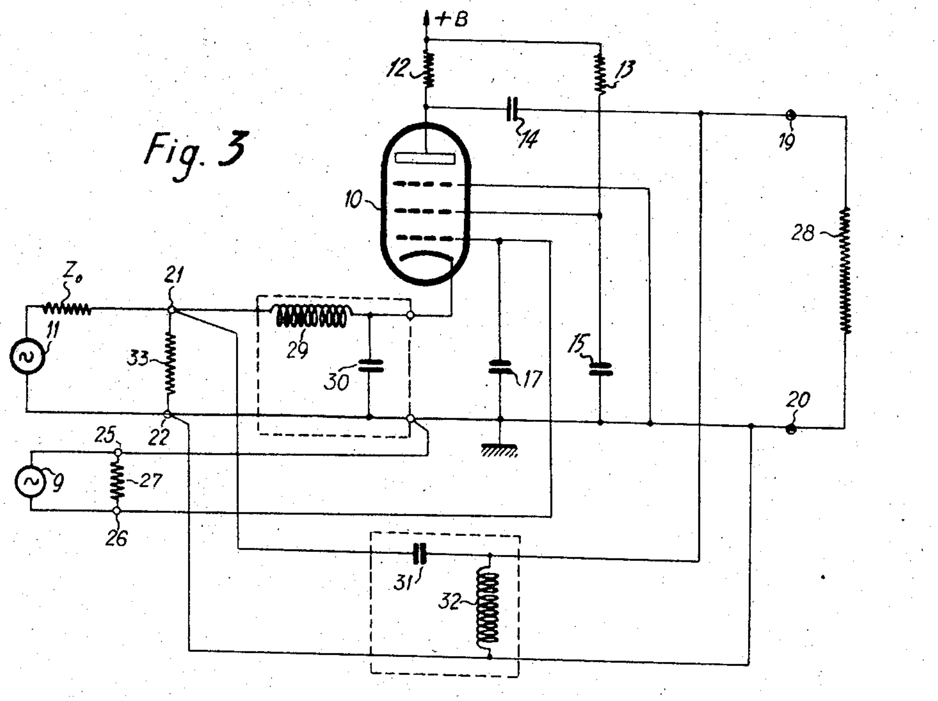
Figures 3 and 4 are diagrams of other embodiments of the invention, using the anode-cathode resistance of an electronic tube as a variable resistance.

Referring now to Figure 3, it may be seen on it that the arrangement of this figure is analogous to that of Figure 2, but differs from the latter in that diode 10 is replaced by the anode-cathode interval of the electronic tube 10 and in that the modulating voltage delivered at terminals (25, 26) of the source of modulation signal 9 is applied between the fixed potential point 22 of the set-up and the control grid of tube 10. Designating now by $g$ the transconductance of this tube, which is of the pentode type and the internal anode-cathode resistance of which can be considered as very high (said transconductance being defined as the ratio of the variation of the anode current to that of the voltage of the control grid of the tube) calculation gives a slightly different formula from that found in the case of the diode of Figure 2, for the voltage $U_2$ developed at the terminals (19, 20). Still designating by $U_1$ the voltage applied to (21, 22), it is found that:

$$U_2/U_1=(A+jBg)/(C+jD_1) \quad (8)$$

with $$D_1=X_1Y_1(X_2+Y_2)$$

The value of the input impedance Z of the device, seen from the terminals (21, 22) is:

$$Z_1=(C+jD_1g)/(F_1g-jH) \quad (9)$$

with $$F_1=(X_1+X_2)Y_1$$

The quantities designated by (A, B, C, H) have the same values as before.

Still supposing the internal impedance of the carrier current source 11 to be negligible, it is found that when $g$ varies under the influence of the modulating voltage developed at the terminals (25, 26), a non-amplitude modulated and phase-modulated voltage is received at (19, 20), if:

$$A/B=-C/D_1 \quad (10)$$

This relationship is analogous to the relationship (4), valid for the case of Figure 2. The operation of the device is still represented by the diagram of Figure 6. The sensitivity of the device is, similarly, a maximum one (i.e. there is the maximum possible phase variation for a given variation of $g$), if:

$$A/B=\pm g_0;\ C/D_1=\mp g_0 \quad (11)$$

that is, when the rest value $\phi_0$ of the phase angle of $U_2/U_1$ is equal to ±90°.

The phase-modulated voltage developed at the anode of tube 10 is transmitted to the terminal 19 and to the working circuit 28 by the condenser 14, the object of which is simply to avoid applying to the terminals (19, 20) the D.C. voltage (represented on Figure 3 by +B) supplying the anode of tube 10. The elements (12, 13, 15) simply serve to ensure correct supply conditions to the various electrodes of the tube. The elements (17, 27, 29, 30, 31, 32, 33) respectively play the same parts as those with the same reference numbers in Figure 2.

Figure 4:
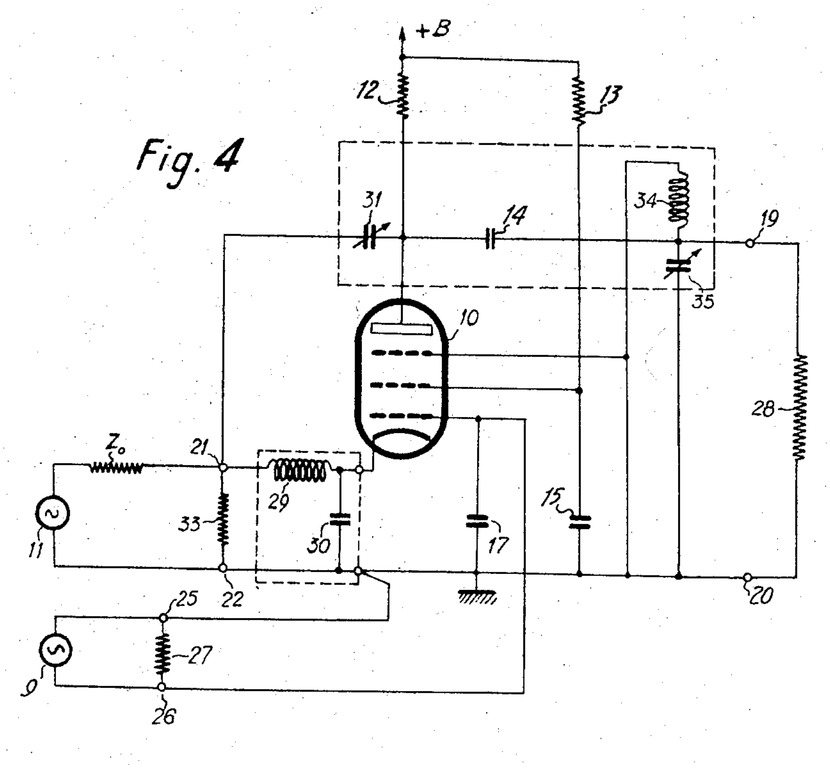

Figure 4 shows a variant of the embodiment of Figure 3, in which, in order to facilitate adjustment, the fixed condenser 31 is replaced by an adjustable condenser. The adjustable condenser 35 allows to obtain a slight variation of the apparent value of the inductance 34 of Figure 4, which plays the same part as the inductance 32 of Figure 3.

Figure 5:
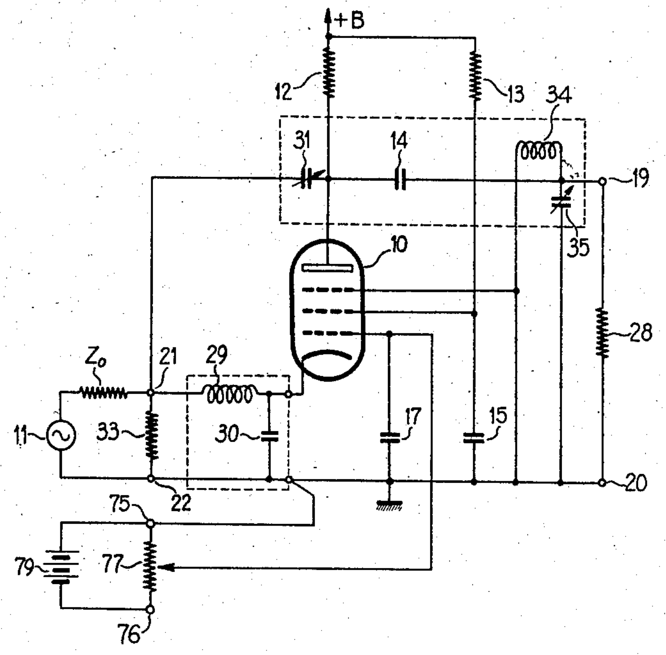
Figure 5 shows a particular case of Figure 4 where the control voltage is a direct-current voltage, manually adjustable, the device then being an adjustable phase-shifter.

Figure 5 represents a manually controlled phase-shifter constructed according to the principle of the invention. The diagram of Figure 5 is identical with that of Figure 4 except in that the source of modulating signal 9 of Figure 4 is replaced in Figure 5 by a source of D.C. voltage 79 connected to the terminals 75, 76 of a potentiometer 77 allowing to adjust the value of the D.C. biasing voltage applied between the cathode and the control grid of the electronic tube 10. If, by adjustment of 77, this biasing voltage is varied, the phase of the voltage at the frequency $\omega$ transmitted from the source of carrier current 11 through the device to terminals (19, 20) varies correspondingly.

Two numerical examples of application, illustrating the practical mode of calculation of the elements of the device of the invention, are given below; the first refers to the case of Figure 2, the second to the case of Figure 3.

*Example I.*—In the case of Figure 2 the incremental "rest" resistance of the diode, at the chosen operating point, will be supposed to be equal to 200 ohms:

$$1/g_0=200 \text{ ohms}$$

The angular frequency $\omega$ will be taken equal to $2\pi$ times 10 mc./s. Therefore $$\omega=2\pi.10^7=6.28.10^7$$

In order to determine the four reactances $X_1$, $X_2$, $Y_1$, $Y_2$ the following conditions will be imposed:

(*a*) for $g$ equal to $g_0$, the input impedance Z of the device will be real; (*b*) this impedance will have a predetermined value $R_1$; (*c*) the above condition (4) will be fulfilled.

Referring to the above-indicated value of Z, the conditions (*a*) and (*b*) become:

$$C/Fg_0=-Dg_0/H=R_1 \quad (12)$$

In order to completely determine the network, an additional condition must be specified. For this purpose, there will be chosen, for instance, an infinite value for $Y_2$. As the impedance of 28 is substantially that of a capacity, when 28 is the input impedance of an amplifier, it will be sufficient to choose for the $Y_2$-branch of the set-up an inductance resonating at the frequency $\omega$ with the capacity $C_0$ of the working circuit. By taking, for example, $C_0$ equal to 20 micromicrofarads, it is found that:

$$L_2=1/C_0\omega^2=12.6 \text{ microhenries}$$

Condition (6) is simplified by the fact that $Y_2$ can be considered as infinite and becomes:

$$2(X_1+X_2)Y_1+X_1X_2=0 \quad (13)$$

On the other hand, the conditions (12) give $$X_1+Y_1=R_1g_0(X_1+X_2) \quad (14)$$
$$(X_1+Y_1)X_2+X_1Y_1=-R_1/g_0 \quad (15)$$

Generally, the calculation of $X_1$, $X_2$, $Y_1$ is rather complicated, but will be considerably simplified by taking $R_1$ equal to $1/g_0$. In this case, there is found:

$$X_2/X_1=-\frac{3}{2};\ Y_1=X_2-R_1\sqrt{3};\ X_1=2R_1/\sqrt{3} \quad (16)$$

hence $$X_1=154 \text{ ohms};\ X_2=Y_1=-231 \text{ ohms}$$

which gives:

$$L_1=24.6 \text{ microhenries}$$
$$C_1=C_2=10.9 \text{ micromicrofarads.}$$

The input impedance of the device, being, in the absence of a modulating signal, equal to 200 ohms, if the device is to be matched with a source 11 having an impedance of 75 ohms (usual value for a coaxial line), a value of 120 ohms is to be chosen for the resistance 33, as $$120\times200/(120+200)=75$$

The apparent impedance of source 11 in parallel with resistance 33 as seen from the device, will then be:

$$75\times120/(75+120)=46 \text{ ohms}$$

The value *deE*/$U_2$, drawn from (1), is found to be equal to:

$$E/U_2=\frac{1+231\,jg}{1-231\,jg}+46\frac{g+j/77}{1-231\,jg}$$

It is easily seen that the second term, the only responsible for the amplitude modulation, modifies but very slightly the value of the first one. As a matter of fact, the relative amplitude variation of $E/U_2$, when $g$ varies from zero to infinite, does not exceed ±6% of its average value.

*Example II.*—Relationships (10) and (11) simplify and become:

$$(2X_1+X_2)Y_1=0$$
$$-(X_1+Y_1)=(X_1+X_2)Y_1g_0 \quad (17)$$

Relationships (17) give:

$$X_2=-2X_1$$
$$X_1+Y_1=g_0X_1Y_1$$

or $$L_1C_2\omega^2=\tfrac{1}{2}$$
$$L_1\omega g_0=1-C_1L_1\omega^2 \quad (18)$$

To determine $L_1$, $L_2$, $C_1$, $C_2$, it is still necessary to write down two supplementary relationships. For instance, one of these may be arbitrarily written:

$$L_2 = C_1\omega^2 = 2 \quad (19)$$

and the voltage gain G of the device, equal to $A/C$, may be arbitrarily fixed at a given value. Designating by $g_0$ the transconductance of tube 10 at the selected operating point, the following equations are found:

$$\begin{aligned} L_1C_1\omega^2 &= G/(G-1) \\ L_1 &= 1/Gg_0 \\ L_2 &= 2/(G-1)g_0 \\ C_1 &= (G-1)/g_0 \\ C_2 &= Gg_0/2 \end{aligned} \quad (20)$$

Taking $g_0$ equal to $5.10^{-4}$ mhos and $\omega$ equal to $2\pi$ times 10 mc./s., there are found, if G is taken equal to 3:

$L_1 = 10.27$ microhenries
$L_2 = 30.8$ microhenries
$C_1 = 16$ micromicrofarads
$C_2 = 12$ micromicrofarads In practice (as it is shown on Figure 4), $L_2$ will be given a lower value than the calculated one, to take due account of the existence of the capacity $C_0$ of the working circuit which is in parallel connection with $L_2$ (ref. number 34, Figure 4), and the adjustable condenser 35 will be given the value corresponding to the correct operation of the system.

What is claimed is:

1. A phase-modulating device comprising four reactances in bridge connection, a pair of input terminals respectively connected to two opposite apices of said bridge, an electronic tube providing a variable resistance connected between the two other opposite apices of said bridge, means for connecting a carrier-current source of fixed frequency to said input terminals, a source of modulation signals delivering a control voltage, means for applying said control voltage to said variable resistance so as to cause it to vary under the influence of said control voltage, a pair of output terminals respectively connected to the terminals of one of said reactances, and means for connecting said output terminals to a working circuit, said variable resistance being the anode-cathode internal resistance of said tube, said electronic tube having at least a cathode, a control grid and an anode, said cathode and anode being respectively connected to said two other apices of said bridge, and said control grid of said tube being connected to a third apex of said bridge through said source of modulating voltage.

2. A device as claimed in claim 1, wherein a condenser is set up in parallel connection with said source of modulating voltage so as to avoid carrier current propagation into latter said source.

3. A device as claimed in claim 1, wherein said reactances consist of two inductances respectively connected in two opposite arms of said bridge and of two condensers respectively connected in the two other arms of said bridge.

4. A device as claimed in claim 3, further comprising an adjustable condenser in parallel connection with one of said inductances.

References Cited in the file of this patent

UNITED STATES PATENTS

| | | |
|---|---|---|
| 1,950,406 | Hoorn | Mar. 13, 1934 |
| 2,551,802 | Kreithen | May 8, 1951 |